United States Patent [19]
Burgess et al.

[11] Patent Number: 6,011,754
[45] Date of Patent: *Jan. 4, 2000

[54] PERSONAL OBJECT DETECTOR WITH ENHANCED STEREO IMAGING CAPABILITY

[75] Inventors: David Burgess; Lee Felsenstein, both of Palo Alto; Steven E. Saunders, Cupertino, all of Calif.

[73] Assignee: Interval Research Corp., Palo Alto, Calif.

[*] Notice: This patent is subject to a terminal disclaimer.

[21] Appl. No.: 09/033,211

[22] Filed: Mar. 2, 1998

Related U.S. Application Data

[63] Continuation-in-part of application No. 08/637,552, Apr. 25, 1996, Pat. No. 5,724,313.

[51] Int. Cl.[7] .................................................. G01S 15/93
[52] U.S. Cl. ............................ 367/116; 367/910; 367/102
[58] Field of Search ................................... 367/116, 910, 367/102

[56] References Cited

U.S. PATENT DOCUMENTS

| | | |
|---|---|---|
| 3,172,075 | 3/1965 | Kay . |
| 4,159,526 | 6/1979 | Mosley, Jr. et al. . |
| 4,280,204 | 7/1981 | Elchinger . |
| 4,551,825 | 11/1985 | Biber . |
| 4,680,740 | 7/1987 | Treptow . |
| 4,712,003 | 12/1987 | Ban et al. . |
| 4,761,770 | 8/1988 | Kim et al. . |
| 5,341,346 | 8/1994 | Youlton . |
| 5,724,313 | 3/1998 | Burgess et al. ......................... 367/116 |

FOREIGN PATENT DOCUMENTS

| | | |
|---|---|---|
| 2 569 843 | 3/1986 | France . |
| 29 31 837 | 2/1981 | Germany . |
| 1 098 927 | 1/1968 | United Kingdom . |
| 0 008 455 | 3/1980 | United Kingdom . |

OTHER PUBLICATIONS

Beverly A. Goldstein article entitled "Acoustic analysis of the Sonic Guide," Acoustical Society of America (1981).

*Primary Examiner*—Daniel T. Pihulic
*Attorney, Agent, or Firm*—Brooks & Kushman PC

[57] ABSTRACT

A personal object or obstacle detector apparatus with enhanced stereo imaging capability includes a sonar system having dual receivers with field lobes positioned based on psychoacoustic considerations such as interaural intensity difference (IID) and interaural time difference (ITD). Receiver field pattern shapes and directions are selected to match the natural IID and ITD associated with human hearing. In one embodiment, dual receivers are used with a common transmitter while another embodiment utilizes two transmitter/receiver pairs with the transmitter and receiver collocated.

12 Claims, 4 Drawing Sheets

PERSONAL OBJECT DETECTOR WITH ENHANCED STEREO IMAGING CAPABILITY

CROSS-REFERENCE TO RELATED APPLICATION

This application is a continuation-in-part application of commonly owned application Ser. No. 08/637,552 filed Apr. 25, 1996, now U.S. Pat. No. 5,724,313, the disclosure of which is hereby incorporated by reference in its entirety.

TECHNICAL FIELD

The present invention relates to object detection devices for use by visually-impaired individuals.

BACKGROUND ART

There are a number of known object detection devices for electronically alerting visually-impaired persons of obstacles within their environs. (These object detection devices are also called "obstacle" detection devices.) U.S. Pat. No. 3,172,075 to Kay discloses an apparatus for providing information relative to position of objects. The Kay apparatus uses a centrally located transmitter and two laterally displaced receiving elements having directional receptivities which extend into the field of view to detect objects offset from the reference axis of the receiving elements.

U.S. Pat. No. 4,280,204 to Elchinger describes a mobility cane for the blind having a dual-mode ultrasonic obstacle detection apparatus mounted thereon. The ultrasonic detection apparatus produces an audible warning of objects within a predetermined spatial zone having a maximum and minimum zone depth.

U.S. Pat. No. 4,551,825 to Biber discloses an object detection system which periodically changes a sonic energy transmission frequency to periodically change the beam width of a transmission pattern for object direction distinguishing purposes. Variable and fixed pitch audio signals are generated, with the generation and pitch of the variable-pitch signal being object distance dependent, and the generation of the fixed-pitch signal being dependent upon the object presence only.

U.S. Pat. No. 4,680,740 to Treptow discloses an audio aid for the blind which generates a high audio frequency signal modulated by a low audio frequency signal, and emits a directional beam of acoustic energy based thereupon. The acoustic energy reflects off of an object in the vicinity of a user to return a sound signal which can be audibly discerned by the user to detect the presence of the object and its approximate location.

U.S. Pat. No. 4,712,003 to Ban et al. discloses a guide device in the form of a walking stick having a source for emitting infrared radiation and a photoelectric element for receiving the infrared radiation reflected from an object. An electric circuit produces information related to the distance of the object based on the illuminance or energy of received radiation on the photoelectric element. A vibration, which is to be sensed by a user, is then produced having a frequency and amplitude which are dependent upon the distance information produced by the electric circuit.

U.S. Pat. No. 4,761,770 to Kim et al. describes an ultrasonic sensory aid for a blind person which receives a reflected ultrasonic echo signal from an object, stretches the reflected signal in a time axis, and converts the stretched signal into an audible frequency signal.

The prior art devices are not amenable to simultaneously detecting multiple objects or obstacles, nor to conveying information related to the multiple objects to the user in a manner which creates a veridical stereo image of the object and its location.

SUMMARY OF THE INVENTION

As such, one object of the present invention is to provide an object detector which can be miniaturized and produced at a low cost while capable of creating a veridical stereo image of the object for the user. A further object of the present invention is to provide an object or obstacle detector which considers human psychoacoustic phenomena in positioning of the receivers and their associated field patterns.

Another object of the present invention is to provide an obstacle detector which is inconspicuous within the environment of the user. Still another object of the present invention is to provide an object or obstacle detector which can detect several objects simultaneously and differentiate between them to the user.

In carrying out the above objects, the present invention provides a personal object detector comprising a continuous transmission frequency modulation (CTFM) ranging system and an audio output device. The CTFM ranging system is operative in transmitting a frequency-swept pressure wave, receiving a reflected frequency-swept pressure wave from an object, and forming an audio signal based upon a frequency difference between the frequency-swept pressure wave and the reflected frequency-swept pressure wave. The audio output device produces an acoustic pressure wave in dependence upon the audio signal. In a preferred embodiment, the acoustic pressure wave contains a tone for each of several objects, wherein each tone has a pitch dependent upon the distance from the CTFM ranging system to the corresponding object.

Further in carrying out the above objects, the present invention provides a personal object detector apparatus comprising a first CTFM ranging system, a second CTFM ranging system, and a pair of audio output devices. The first CTFM ranging system transmits a first frequency-swept pressure wave, receives a first reflected frequency-swept pressure wave from an object, and forms a first signal dependent upon a frequency difference between the first frequency-swept pressure wave and the first reflected frequency-swept pressure wave. The second CTFM ranging system transmits a second frequency-swept pressure wave, receives a second reflected frequency-swept pressure wave from the object, and forms a second signal dependent upon a frequency difference between the second frequency-swept pressure wave and the second reflected frequency-swept pressure wave. The pair of audio output devices produces a tone within a stereo sound image based upon the first signal and the second signal, wherein the tone is positioned within the stereo sound image in accordance with the lateral position of the object. Further, the tone has a pitch dependent upon a distance to the object.

These and other features, aspects, and embodiments of the present invention will become better understood with regard to the following description, appended claims, and accompanying drawings.

BEST MODE FOR CARRYING OUT THE INVENTION

Figure 1:
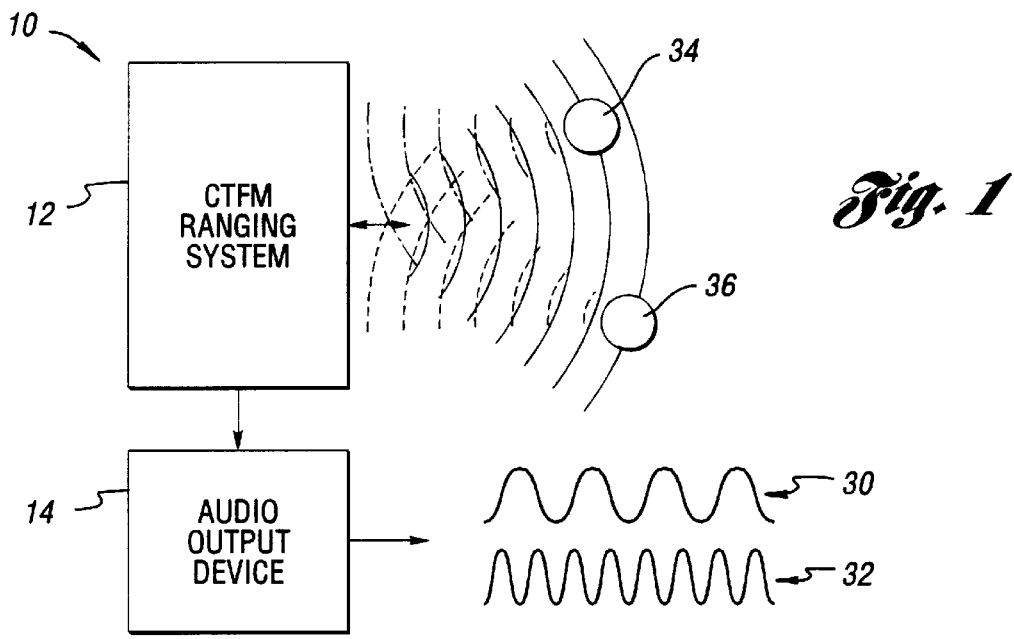
FIG. 1 is a block diagram of an embodiment of a personal object detector in accordance with the present invention.

Referring to FIG. 1, there is shown a block diagram of an embodiment of a personal object or obstacle detector 10 in accordance with the present invention. The detector 10 comprises a continuous time frequency modulation (CTFM) ranging system 12 operative in detecting one or more obstacles 34 and 36 (which also may be referred to as objects or targets) in proximity thereto. The CTFM ranging system 12 is coupled to an audio output device 14, which produces acoustic pressure waves 30 and 32 indicative of the detected objects. As a result, a visually-impaired user is informed of nearby obstacles by sensing the acoustic pressure wave generated by detector 10.

Figure 2:
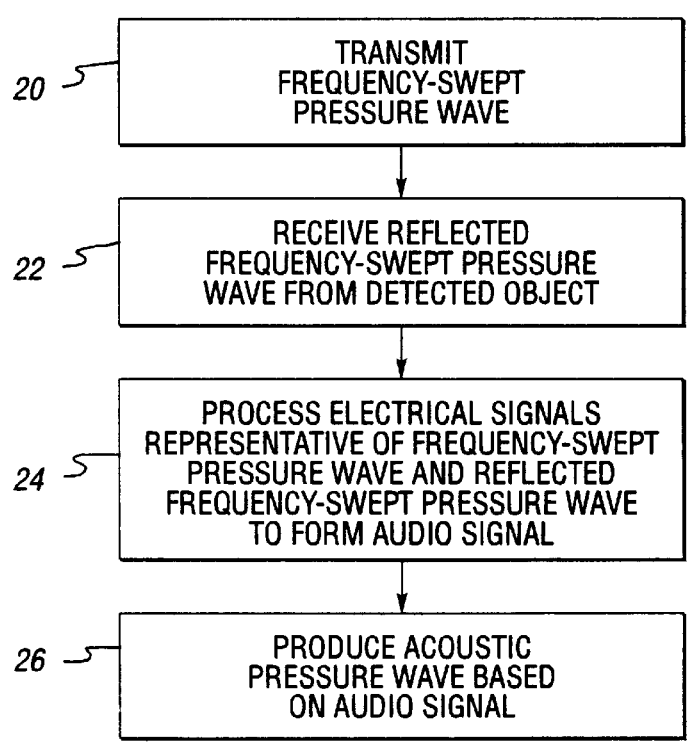
FIG. 2 is a flow diagram of steps performed by an embodiment of the personal object detector.

A flow diagram of steps performed by the personal object or obstacle detector 10 is illustrated in FIG. 2. The CTFM ranging system 12 performs the step of transmitting a frequency-swept pressure wave in open-air in a predetermined direction, as indicated by block 20, and also the step of receiving a corresponding reflected frequency-swept pressure wave from each detected object, as indicated by block 22.

As indicated by block 24, electrical signals representation of the frequency-swept pressure wave are processed by the CTFM ranging system 12 to form an audio signal. The audio signal contains a corresponding signal component, or tone, for each detected object. Each signal component has a frequency, or pitch, dependent upon a frequency difference between the reflected frequency-swept pressure wave. Further, each signal component has an amplitude, or loudness, dependent upon the frequency difference.

The audio signal is applied to the audio output device 14 in order to perform a step of producing the acoustic pressure wave, as indicated by block 26. The acoustic pressure wave includes a tone corresponding to each detected object. In a preferred embodiment, the pitch of each tone increases with the distance to the corresponding object, and the loudness of each tone increases with the closeness of the corresponding object. Consequently, a plurality of tones are produced for a plurality of detected objects. This is illustrated in FIG. 1, where a tone 30 and a tone 32 are simultaneously produced for an object 34 and an object 36, respectively.

Figure 3:
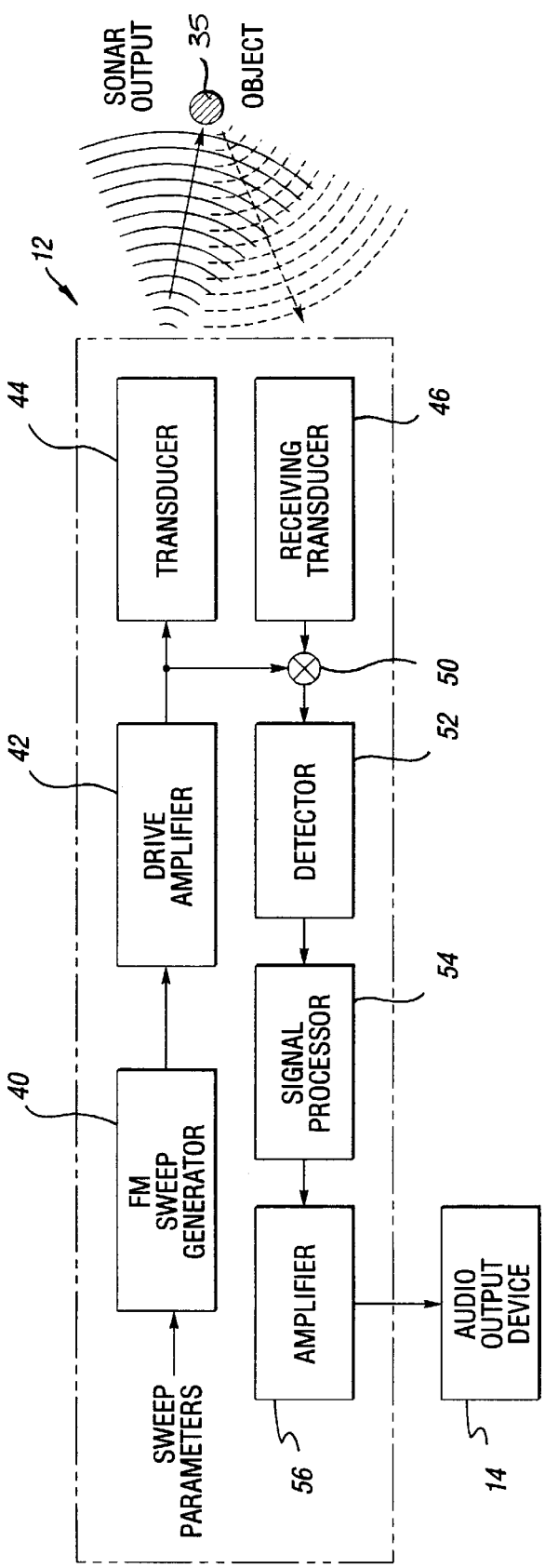
FIG. 3 is a block diagram of an embodiment of a CTFM ranging system for use in embodiments of the present invention.

A block diagram of an embodiment of a CTFM ranging system 12 in accordance with the present invention is shown in FIG. 3. As previously described, the CTFM ranging system 12 measures an obstacle's echo delay by transmitting a frequency-swept pressure wave and then measuring the difference in frequency between the reflected pressure wave and the current transmitter output. However, other types of analysis may be used to extract additional information from the reflected pressure wave.

The CTFM ranging system 12 includes an FM sweep generator 40 which generates a frequency-swept signal based upon one or more sweep parameters. The frequency-swept signal is amplified by a drive amplifier 42 for application to a transducer 44. The transducer 44 generates a frequency-swept pressure wave in accordance with the frequency-swept signal. In a preferred embodiment, the transducer 44 is an ultrasonic transducer capable of converting an electrical signal into an ultrasonic pressure wave.

A receiving transducer 46 receives the reflected frequency-swept pressure wave which is returned by each object or obstacle (generally represented by object 35). In a preferred embodiment, the transducer 46 is an ultrasonic transducer capable of converting an ultrasonic pressure wave into an electrical signal. More generally, the transducer 46 converts the reflected frequency-swept pressure wave into an electrical signal (herein referred to as "the reflected signal") representative thereof.

The reflected signal and the frequency-swept signal are combined by a summing element 50 to form a combined signal. The combined signal is applied to a detector 52 which forms an audio signal by extracting a beat envelope contained in the combined signal. Optionally, the beat envelope is applied to a signal processor 54 to perform additional signal analysis and/or extract additional information from the reflected pressure wave as described herein. The processed audio signal is applied to an audio amplifier 56 for application to the audio output device 14.

In preferred embodiments of the present invention, the FM sweep generator 40 generates a sinusoidal wave with a linearly swept frequency. The transmission begins at a base frequency, denoted by the variable $f_o$, and sweeps with frequency increasing at a sweep rate denoted by the variable k. Hence, at a time $t_s$, the instantaneous transmitted frequency f is given by the following equation:

$$f = f_o + k t_s \quad (1)$$

When the receiving transducer 46 is collocated with the transmitting transducer 44, the reflected signal from a stationary target at distance d has a delay of:

$$\Delta t_d 2d/v \quad (2)$$

where v is the propagation velocity. The instantaneous frequency of the received reflected signal is given by the following equation:

$$f_z = f_o + k(t_s - \Delta t_r) \quad (3)$$

When the reflected signal is added to the transmitted signal, the resulting summation signal has a beat (or heterodyne) frequency equal to the difference of the frequencies of the two sinusoids. This beat frequency, denoted by the variable $f_b$, is given by the following equation:

$$f_b = f - f_r = f_o + k t_s - f_o - k t_s + k \Delta t_z = k \Delta t_r \quad (4)$$

It can be noted that the beat frequency $f_b$ is independent of both the base frequency $f_o$ and time $t_s$. Hence, as long as the transmitter sweep rate remains constant, the beat frequency associated with the obstacle is fixed. A beat envelope signal is extracted by the detector 52, which may be embodied by either a synchronous demodulator or a simple diode-capacitor envelope detector. Each detected obstacle produces a heterodyne tone of fixed frequency in the envelope signal. The target range profile can be extracted with a filter bank or a Fourier transform calculation.

The beat envelope signal is presented to a human listener using the audio output device 14, which may take the form of a headphone or preferably one or more speakers. An advantageous property of the swept-sine ranging technique is that the human cochlea may be used as an analysis filter bank for the envelope signal. A proper choice of sweep rate results in an envelope signal which spans a useful range of the human auditory system. As a result, the listener is able to comprehend the range profile directly as a set of audible tones.

The accuracy of the measurement of $\Delta t_r$, and thus of obstacle distance, is dependent on the signal-to-noise ratio of the system and the duration over which the envelope signal is observed. Arbitrary range accuracy is possible by waiting a sufficient amount of time for the measurement. Conversely, more rapid measurements can be made when accuracy requirements are relaxed. In practice, the greatest limitation on range resolution is the linearity of the frequency sweep.

Next, the effect of stopping or repeating the sweep is analyzed. For a linear frequency modulation with a relatively slow sawtooth wave, the relationship of Equation 1 still holds, but $t_s = t \bmod t_{smax}$, where $t_{smax}$ is the sweep period. The transmitted sinusoid begins at frequency $f_o$ and sweeps at rate k to $f_{max} = f + k t_{smax}$. The span of frequencies is $\Delta f = k t_{smax}$. The system also has some maximum operating range $d_{max}$ with an associated echo delay $\Delta t_{rmax}$.

While the quantity $(t_s - \Delta t_r)$ is positive, the beat frequency relationship of Equation 3 holds. A complication results, however, when a reflected signal from a previous sweep cycle is received. An aliased beat frequency, $f_{b'}$, results which is offset from the original beat frequency, $f_b$, by an amount $\Delta f$:

$$f_{b'} = |f_b - \Delta f| \qquad (5)$$

The aliased beat frequency corresponds to an aliased image in the range profile, analogous to clutter echoes in a pulse-based ranging system. These aliased images can be identified by the signal processor 54 either for removal or for use in reinforcing the obstacle images with which they are associated.

One way to control aliased images is to set the maximum operating range so that $2\Delta t_{rmax} < t_{smax}$. This operating condition causes the aliased images of in-range obstacles to appear only at frequencies above $k\Delta t_{rmax}$. Furthermore, the aliased images of distant clutter, which have beat frequencies less than $k\Delta t_{rmax}$, will be attenuated due to distance. Establishing $\Delta t_{rmax} << t_{smax}$ will cause clutter images to be so greatly attenuated that they can be ignored.

For applications requiring a more exact solution to the aliasing problem, it is possible to identify aliased images by observing the time-domain structure of the envelope signal. The beat signal associated with an aliased image will appear immediately after the start of the new frequency sweep period, but a beat signal associated with the current sweep period and having delay $\Delta t_r$ and frequency $f_b = k\Delta t_r$ will not appear until some time $\Delta t_r$ after the start of the new sweep. Based upon these conditions, the signal processor 54 can identify a beat signal as an alias, and utilize the relationship of Equation 5 to determine which obstacle produced it. If an aliased signal does not correspond to an in-range target, then it is a clutter image.

An environmental noise source can generate a false image in the range profile if the noise source produces a swept sinusoid near the CTFM ranging system's band of operation and with a sweep rate similar to that of the transmitter. Otherwise, the frequency sweeping behavior of the CTFM ranging system 12 will "smear" the noise source over a large span of the range profile. Hence, uncorrelated environmental noise results simply in an increased noise floor in the range profile.

Next, analyses of particular environmental noise sources are described. Consider an environmental noise source which produces pulses at some center frequency and bandwidth. Because the range information of the swept sine system is in the frequency domain, the energy of each pulse will be distributed over a large region in the range profile. Hence, false images are not generated for this type of environmental noise.

Next, consider an environmental noise source which emits a sinusoid of fixed frequency. When mixed with the transmitted swept sinusoid, the fixed tone will result in a sweeping beat frequency in the envelope signal. When analyzed over a sufficiently long period, the energy of this sweeping beat frequency will be distributed over a large region in the range profile. As a result, false images are not generated for this type of environmental noise either.

Finally, consider a source which emits broadband noise which covers the operating band of the ranging system. Such a source will simply produce noise distributed evenly over the range profile. As a result, false images are not generated.

Any given obstacle will not be a perfect reflector, but will instead selectively reflect or absorb waves of particular frequencies. As part of the analysis of the envelope signal performed by the signal processor 54, it may be desirable to recover some information about the spectrum associated with each obstacle. Such information may prove useful in the identification of obstacles in some applications. The reflectance spectrum conveys information about the materials, texture, or geometry of a target, depending on the wavelengths used.

Because the obstacle is illuminated with a slowly sweeping sinusoid, its reflected signal, in the time domain, is a direct measurement of the obstacle's reflectance spectrum over the sweep range. Once the beat frequency of an obstacle is known, the obstacle's reflectance spectrum can be extracted in the time domain through the use of modulation and lowpass filters within the signal processor 54.

For an obstacle which is moving relative to the transmitting transducer 44, there is a Doppler shift in the frequency of the reflected signal given by:

$$\Delta_d f = 2 \cos\theta v / \lambda \qquad (6)$$

where $\theta$ is the angle of the obstacle's motion normal to the ranging system, v is obstacle's velocity, and $\lambda$ is the signal wavelength. This shift in the frequency of the reflected signal results in an identical shift in the beat frequency associated with the obstacle. As a result, objects which are receding from the CTFM ranging system 12 appear to be farther away than they actually are, and objects which are approaching the CTFM ranging system 12 appear to be closer than they actually are. To minimize false range effects due to Doppler shift, one can choose the sweep rate k to be sufficiently large that $f_b >> \Delta_d f$ for objects in the range of interest.

If modulation is used to isolate the beat signal of the obstacle in the time domain, the rising edge of the return signal relative to the start of the sweep period can provide a measurement of $\Delta t_r$ which is independent of Doppler shift.

This value of $\Delta t_r$ can be compared to the measured value of the beat frequency and the difference between the expected and measured beat frequency can be used to measure Doppler shift:

$$\Delta_d f = f_b - k\Delta t_r \qquad (7)$$

In a preferred embodiment, the personal object detector takes the form of a short-range, ultrasonic, open air sonar system designed to be used by a visually-impaired person for detecting nearby objects. The useful target range is mapped into an audible frequency span so that the envelope signal may be presented directly (without the necessity of the signal processor 54) to the user via the audio output device 14. To match the operating range of many low-cost amplifiers and earphones, a range of 100 Hz to 4 kHz is selected for the audio output. For a maximum operating range of 5 meters, $\Delta t_{rmax} = 30$ ms. The sweep rate k is selected to be 133 kHz/sec to produce a beat frequency of 4 kHz for an obstacle at the maximum distance.

The range resolution of this embodiment is determined by the human auditory system and not by the sweep period. In order to reduce the effects of aliasing and the periodic interruption of the audio output signal when the sweep is reset, it is desirable to make the sweep period as long as possible. However, it is also desirable to limit the bandwidth of the ranging system to less than an octave for reasons of cost and because the attenuation of sound in air increases sharply with frequency.

In accordance with this trade-off, the base frequency of the system may be selected near 100 kHz, the sweep period may be selected near 750 ms, and the upper frequency may be selected near 200 kHz. With a 750 ms sweep period and an output bandwidth of 4 kHz, aliased images result for clutter only at ranges of more than 250 meters. Clutter reflections at this range will be attenuated by about 68 dB due to inverse square losses and effectively attenuated to zero by atmospheric attenuation (relative to in-range targets).

Normal motion of the user will result in Doppler shifts on the order of 100 Hz to 300 Hz. Because the frequency sweep of the sonar is rising over time, the Doppler shift will cause an object moving toward the user to appear slightly closer than its actual distance. An object moving away from the user will appear slightly further away than its actual distance. This effect of Doppler shift is minor, however, in the operation of the device as an object detector, and in fact may be a benefit to the user.

The parameters chosen above may cause close-range targets to be mapped to subsonic beat frequencies which the user cannot hear or which cannot be reproduced by the audio output device. There are two other problems in the user's perception of the output tones. First, the direct mapping of frequency to distance may not be intuitive for most users. Second, because the sensitivity of the ear varies with frequency, the perceived loudness of the tone associated with an object will not vary directly with distance, even if the amplitude of the tone does. These problems may be obviated with one or more of the following signal processing techniques—or a combination thereof:

(1) Apply modulation to shift the spectrum of the audio output. This would improve the user's perception of nearby objects, which might otherwise be represented by subsonic tones. In a stereo system, this will also improve the stereo image as explained in greater detail below;

(2) Apply nonlinear distortion to add harmonics to the audio output. This would improve the user's perception of nearby objects, which might otherwise be represented by subsonic tones. In a stereo system, this will also improve the stereo image;

(3) Apply modulation and filtering to reverse the frequency scale of the audio output signal so that closer objects are represented by higher frequency tones, instead of lower frequency tones. In the preferred embodiment set forth herein, this would be accomplished by modulating the audio output with a 4 kHz oscillator and then applying a 4 kHz lowpass filter. This type of processing will give a frequency-distance relationship which may be more intuitive for the user. This type of processing would also correct the problem of nearby objects being represented by subsonic tones;

(4) Apply equalization (such as A-weighted equalization) to compensate for the frequency-dependent sensitivity of the ear. The inclusion of an audio filter in the signal processor 54 could equalize the output signal so that objects of equal cross-sectional areas would produce tones of equal perceived loudness at all distances; and/or (5) Apply reverberation so that the ratio of direct to reverberant sound decreases with the distance of each object. This type of processing will produce a more natural sense of the distances of objects, since reverberation is an important distance cue in human audition. This processing can be accomplished by passing the audio signal through a lowpass or highpass filter followed by a reverberator and then summing the result with the original audio signal.

Figure 4:
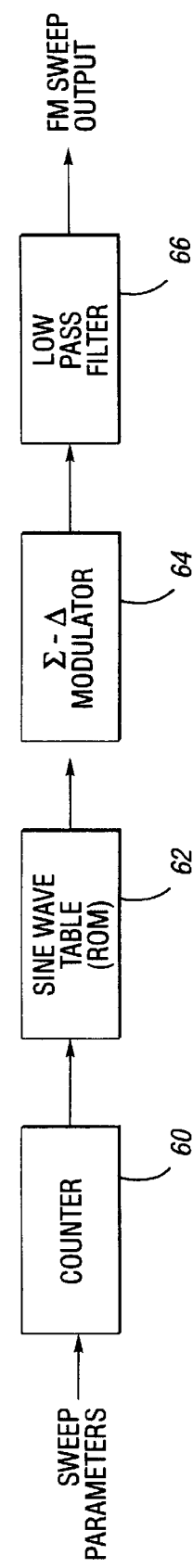
FIG. 4 is a block diagram of an embodiment of an FM sweep generator for use in embodiments of the present invention.

Turning now to FIG. 4, there is shown a block diagram of an embodiment of an FM sweep generator for use in embodiments of the present invention. The sweep parameters, which control the frequency of the FM sweep generator, are applied to a counter 60. The output of the counter 60 drives a sine wave look-up table 62 having a plurality of sine function values stored therein. The sine wave look-up table 62 is typically embodied by a read-only memory (ROM).

The size of the sine wave look-up table 62 determines the wave data resolution, while the length of the counter 60 determines frequency resolution. In practice, a plurality of upper-significant output bits (but not all of the output bits) of the counter 60 are utilized to provide an address to the sine wave look-up table 62.

The output of the sine wave look-up table 62 is applied to a sigma-delta modulator 64. Both the sigma-delta modulator 64 and the counter 60 are clocked by a single clock (not illustrated) having a bit rate greater than the desired frequency of the sonar output. In practice, the bit rate of the clock can be on the order of 10 to 100 times the sonar output frequency. The sigma-delta modulator 64 produces a high-speed bit stream output which is applied to a low pass filter 66 to get a sinusoidal, FM wave.

The FM sweep output can be applied directly to the drive amplifier 42 in FIG. 3. Preferably, the drive amplifier is either a Class D amplifier or a Class H amplifier.

Figure 5:
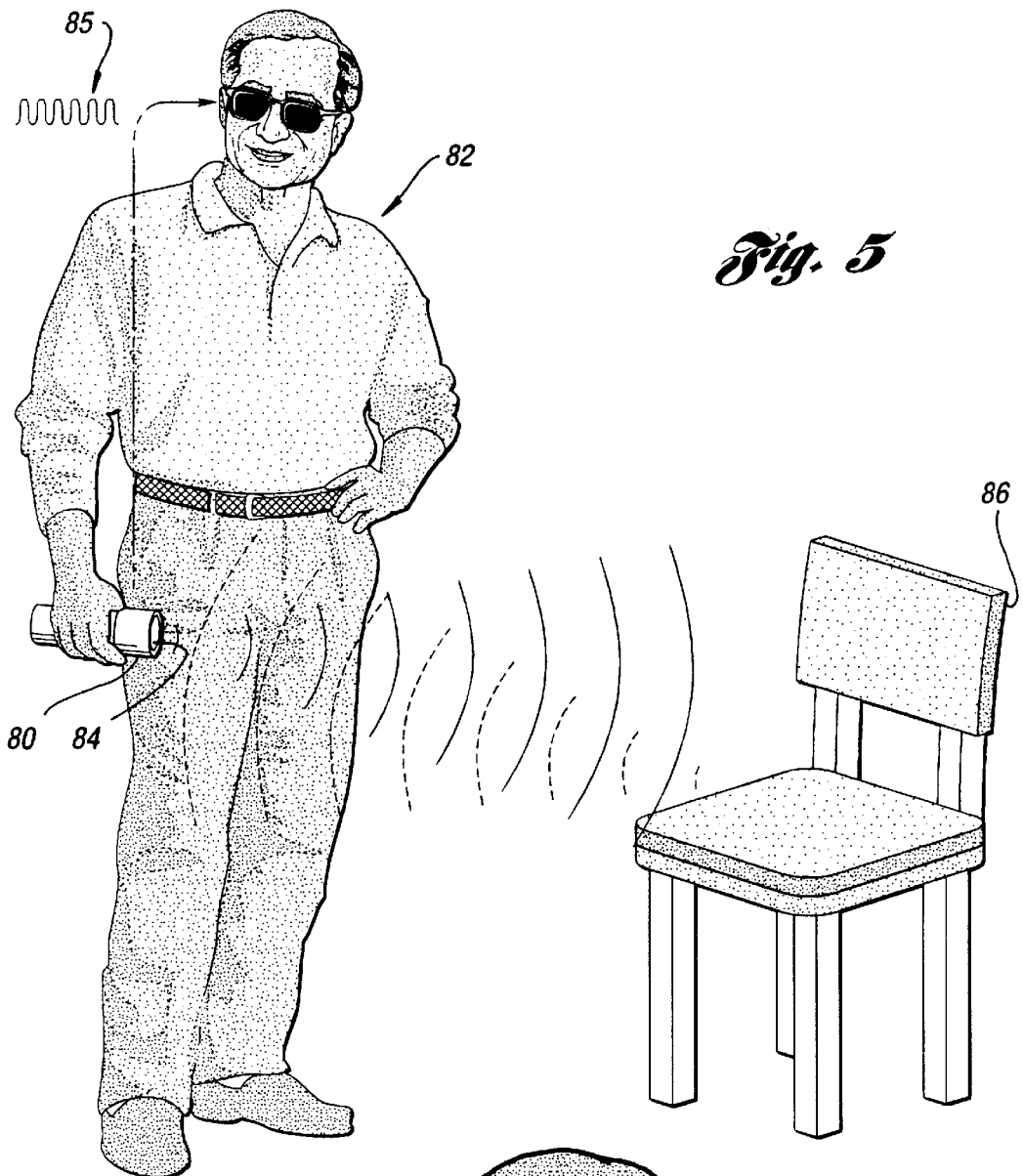
FIG. 5 is an environmental view of an embodiment of a personal object detector.

The personal object detector may be packaged in a variety of different forms. As illustrated in FIG. 5, the detector may include a housing 80 which accommodates the CTFM ranging system (not specifically illustrated) and the audio output device (not specifically illustrated). Preferably, the housing 80 permits handheld use of the obstacle detector by a user 82. As illustrated, the housing 80 may be similar in form to a small flashlight. The detector produces one or more audio tones 85 when the transmitting transducer 84 in the CTFM ranging system is directed, by the user 82, toward an object such as a chair 86.

Alternatively, the personal object or obstacle detector may be packaged in any wearable garment member for the head, arms, legs, torso, etc. of the wearer, adapted to mechanically receive the CTFM ranging system. For example, the detector could be positioned or included in a shirt, jacket, hat, cap, visor, headband or other headgear, vest, necklace, pendant, wristwatch, armband, shorts, pants, shoes, boots, belt, and the like. In this regard, FIG. 6 illustrates a headband 90 adapted to mechanically receive the CTFM ranging system.

Figure 6:
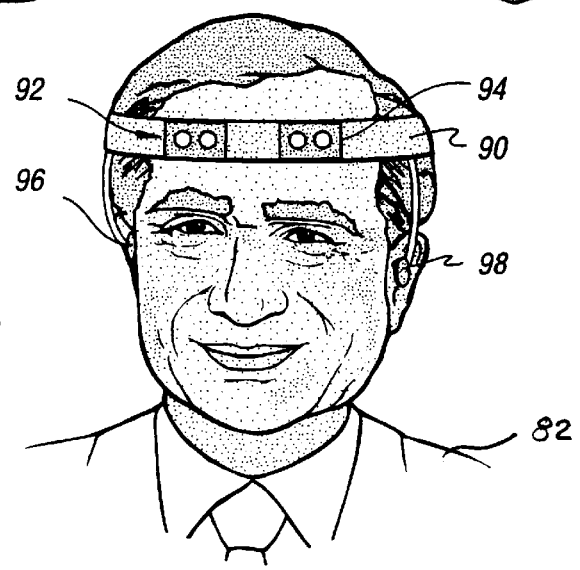
FIG. 6 is a view of another embodiment of a personal object detector.

The headband embodiment of the obstacle detector, as shown in FIG. 6, which utilizes a pair of CTFM ranging systems 92 and 94, and a pair of audio output devices 96 and 98. The pair of audio output devices 96 and 98, which may be in the form of earphones or headphones, produce a stereo auditory map of obstacles in front of the user. Preferably, the pair of audio output devices 96 and 98 produces a natural auditory localization of a detected obstacle. Here, the user 82 is able to determine the lateral position of the object or obstacle by the position of the tone in the resulting stereo image.

Figure 7:
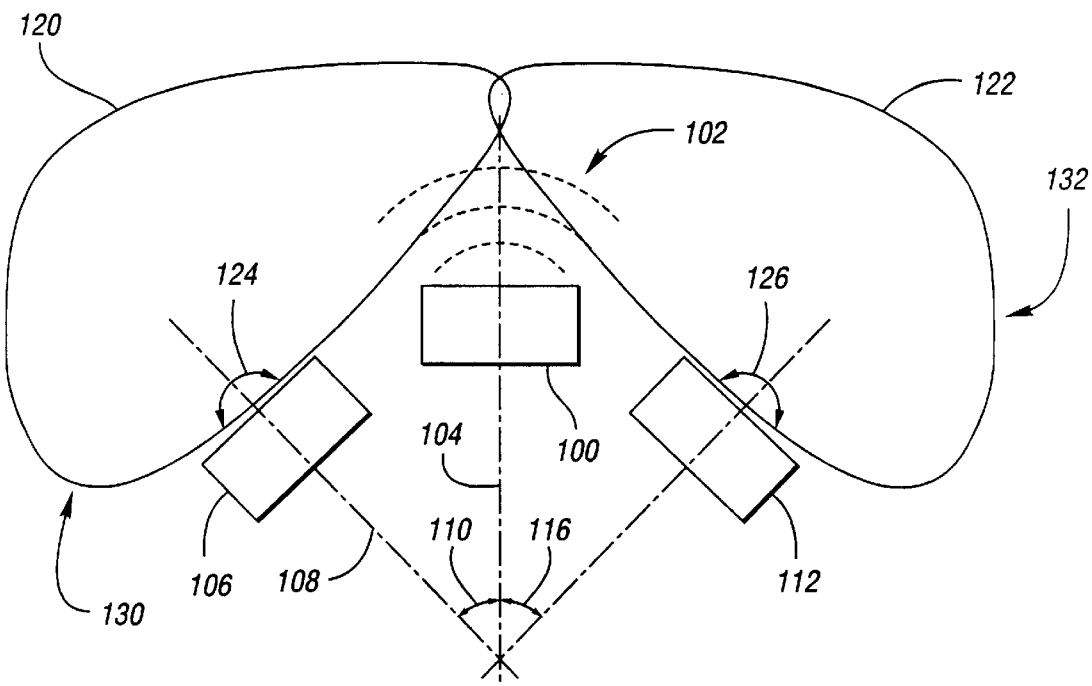
FIG. 7 illustrates placement of the receivers and corresponding field patterns for one embodiment of a personal object detector using a single transmitter according to the present invention.
Figure 8:
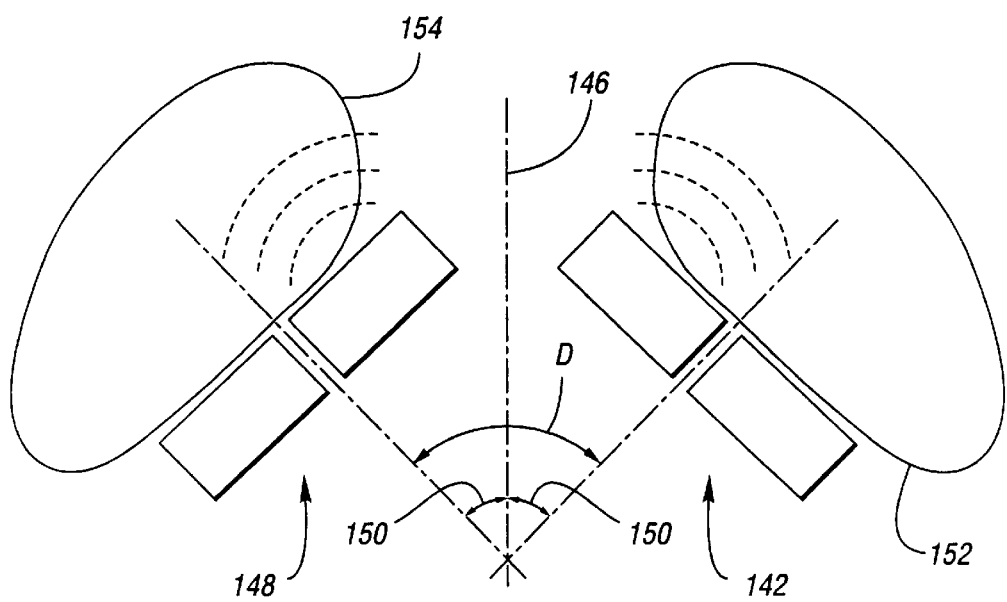
FIG. 8 illustrates placement of receivers and corresponding field patterns for an alternative embodiment of a personal object detector using dual transmitters according to the present invention.

The audio output devices 96 and 98 also preferably give the user a sensation that the sound is emanating from the detected obstacle. This may be accomplished by judicious selection of the sonar receiver positions and/or field patterns based on human psychoacoustic phenomena. For example, important cues for human auditory stereo imaging include the interaural intensity difference (IID) and the interaural time difference (ITD). A sound originating from a source directly in front of the user will arrive at the ears at the same time such that the ITD is zero. However, when a sound originates from the far right or far left field, it reaches the closer ear about 0.6 milliseconds (msec) sooner than it reaches the farther ear. This time difference is an important cue in determining the position of the sound source. As such, according to embodiments of the present invention as illustrated in FIGS. 7 and 8, the receiving elements of a head-mounted sonar system are preferably placed at the sides of the head and separated by about the same distance as the wearer's ears so that the resulting stereo sonar image will have a psychoacoustically correct ITD. Proper placement of the receivers provides the correct ITD regardless of the particular receiver field pattern or the type of sonar signal, whether pulsed AM, pulsed FM, CTFM, or the like.

Likewise, when a sound source is directly in front of the user, the same sound level is detected by both ears. However, when a sound source is directly left or right of the user, the sound in the closer ear is about 20 dB louder than the sound in the farther ear pointing away from the source. That is, the IID is near zero for sound sources directly in front of the user but is about 20 dB for sources directly to the left or right of the user's head. Psychoacoustically correct IID in a sonar image can be achieved by appropriate selection and orientation of the field patterns of the receiving elements.

As illustrated in FIG. 7, one embodiment of the present invention uses a single sonar transmitter 100 which transmits an acoustic pressure wave 102 which may be a pulsed AM, pulsed FM, CTFM, or similar signal. Transmitter 100 is preferably located along a central axis 104. A first receiver 106 having a receiver axis 108 is preferably positioned at an angle 110 relative to the central axis 104. Similarly, a second receiver 112 has an associated receiver axis 114 forming an angle 116 relative to the central axis 104 of transmitter 100. Receivers 106 and 112 include directional field patterns or configurations, generally indicated by reference numerals 120 and 122, respectively. As illustrated, field patterns 120 and 122 preferably form an angle 124 and 126 of about 180° and are positioned symmetrically about central axis 104 at angles 110 and 116 of about 45° to provide a total divergence of about 90°. As such, a sound or object located in an area indicated by reference numeral 130 will preferably result in about a 20 dB field difference in the signal of receiver 106 relative to receiver 112. Likewise, a sound or object in the general area indicated by reference numeral 132 will have a field difference of about 20 dB between the signal of receiver 112 relative to the signal of receiver 106.

An alternative arrangement using dual receiver/transmitter pairs is illustrated in FIG. 8. A first receiver/transmitter pair 142 is positioned at an angle 144 of about 45° relative to a central reference axis 146. A second receiver/transmitter pair 148 is positioned at an angle 150 of preferably about 45° relative to central axis 146 creating a total divergence "D" of about 90°. In this configuration, the field lobes 152 and 154 are generally axially parallel to the corresponding axes of the transmitters in the receiver/transmitter pairs 142 and 148, respectively. However, the polar lobes of the receivers are still positioned to match the natural IID and ITD associated with human hearing. Similar to the arrangement of FIG. 7, this selection and positioning will produce correct IID and ITD for any type of sonar signal including pulsed AM, pulsed FM, CTFM, and the like.

The above-described embodiments of the present invention have many advantages. By employing a CTFM ranging system, much of the electronics of the personal obstacle detector can be contained within a single VLSI chip. As a result, the object detector can be produced at a low cost, and is small enough to be either handheld, worn on a garment member, positioned in a headband, or placed in a shirt pocket, etc.

Further, by packaging the personal obstacle detector as a wearable garment member, a visually-impaired user is much less likely to misplace the detector (which is a common problem with other assistative devices for the blind). In addition, wearable packaging is advantageous in that the detector does not attract attention from others located within the environment of the user.

Yet another advantage is that the CTFM ranging system is capable of simultaneously detecting multiple objects or obstacles. In response thereto, a plurality of tones are produced, with separate tones corresponding to individual objects. Also, each tone has a pitch dependent upon the distance from the corresponding object to the CTFM ranging system, and an intensity dependent upon the size of the corresponding object.

Also, by utilizing the human auditory system of the user for the direct analysis of sonar signals, many embodiments of the present invention do not require the use of an analysis/decision system for driving a user interface. Practically, embodiments of the present invention are realized to detect passive objects at distances of 0.5 to 10 meters. Likewise, appropriate placement of dual sonar receivers and/or proper selection and orientation of the receiver field patterns based on physchoacoustic considerations results in a veridical stereo image of the objects to the user. Appropriate receiver field pattern shapes and directions result in a realistic stereo image regardless of the particular type of sonar signal, whether pulsed AM, pulsed FM, CTFM, or the like.

It should be noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

What is claimed is:

1. A personal object detector apparatus comprising:

a first sonar ranging system which transmits a first pressure wave along a first axis, receives a first reflected pressure wave from an object, and forms a first signal dependent upon a frequency difference between the first pressure wave and the first reflected pressure wave;

a second sonar ranging system which transmits a second pressure wave along a second axis, receives a second reflected pressure wave from the object, and forms a second signal dependent upon a frequency difference between the second pressure wave and the second reflected pressure wave the second sonar ranging system being spaced from the first sonar ranging system and positioned so that the second axis intersects the first axis at a predetermined angle; and a pair of audio output devices which produces a tone within a stereo sound image based upon the first signal and the second signal.

2. The personal object detector apparatus of claim 1 wherein at least one of the first and second sonar ranging systems uses pulsed signal modulation.

3. The personal object detector apparatus of claim 2 wherein at least one of the first and second sonar ranging systems uses amplitude modulation.

4. The personal object detector apparatus of claim 2 wherein at least one of the first and second sonar ranging systems uses frequency modulation.

5. The personal object detector apparatus of claim 1 wherein at least one of the first and second sonar ranging systems uses continuous transmission frequency modulation.

6. A personal object detector apparatus comprising:

a sonar ranging system having at least one transmitter for transmitting a pressure wave along a central axis and a plurality of receivers for receiving pressure waves reflected from at least one object, each receiver having a directional receptivity represented by a polar lobe extending generally forward along a lobe axis wherein the lobe axes intersect the central axis; and an audio output device which produces a tone within a stereo sound image based upon signals generated by each of the plurality of receivers in response to receiving the reflected pressure waves.

7. The personal object detector apparatus of claim 6 wherein each receiver is symmetrically positioned relative to the central axis.

8. The personal object detector apparatus of claim 6 wherein the lobe axes intersect the central axis at an angle of about 45 degrees.

9. The personal object detector apparatus of claim 6 wherein the transmitter of the sonar ranging system generates pulsed amplitude modulated signals.

10. The personal object detector apparatus of claim 6 wherein the transmitter of the sonar ranging system generates pulsed frequency modulated signals.

11. The personal object detector apparatus of claim 6 wherein the transmitter of the sonar ranging system generates continuous frequency modulated signals.

12. The personal object detector apparatus of claim 6 wherein the sonar ranging system includes a plurality of transmitters each being associated with one of the plurality of receivers.

* * * * *